US012792917B2

(12) United States Patent
Bournas et al.

(10) Patent No.: US 12,792,917 B2
(45) Date of Patent: Nov. 10, 2026

(54) FILTER BASED PRUNING TECHNIQUES FOR CONVOLUTIONAL NEURAL NETWORKS

(71) Applicant: QUALCOMM Incorporated, San Diego, CA (US)

(72) Inventors: Charalampos Bournas, Athens (GR); Dimitrios Gkountelos, Salonika (GR); Dimitris Georgakakis, Athens (GR); Georgios Keramidas, Patras (GR)

(73) Assignee: QUALCOMM Incorporated, San Diego, CA (US)

( * ) Notice: Subject to any disclaimer, the term of this patent is extended or adjusted under 35 U.S.C. 154(b) by 573 days.

(21) Appl. No.: 18/262,955

(22) PCT Filed: Jul. 3, 2023

(86) PCT No.: PCT/GR2023/000029

§ 371 (c)(1),
(2) Date: Jul. 26, 2023

(87) PCT Pub. No.: WO2025/008646

PCT Pub. Date: Jan. 9, 2025

(65) Prior Publication Data

US 2025/0217648 A1 Jul. 3, 2025

(51) Int. Cl.
*G06N 3/082* (2023.01)
*G06N 3/0464* (2023.01)

(52) U.S. Cl.
CPC ........... *G06N 3/082* (2013.01); *G06N 3/0464* (2023.01)

(58) Field of Classification Search
CPC ............................. G06N 3/082; G06N 3/0464
See application file for complete search history.

(56) References Cited

U.S. PATENT DOCUMENTS

2019/0251442 A1* 8/2019 Koivisto .................. G06N 3/09
2020/0401895 A1 12/2020 Litvak et al.
2021/0073643 A1* 3/2021 Partovi Nia ......... G06N 3/0495
(Continued)

OTHER PUBLICATIONS

Chitty-Venkata Krishna Teja et al: “Array Aware Training/Pruning: Methods for Efficient Forward Propagation on Array-based Neural Network Accelerators”, 2020 IEEE 31st International Conference on Application-Specific Systems, Architectures and Processors (ASAP), IEEE, Jul. 6, 2020 (Jul. 6, 2020), pp. 37-44, XP033801436, DOI: 10.1109/ASAP49362.2020.00016
(Continued)

*Primary Examiner* — Tewodros E Mengistu
(74) *Attorney, Agent, or Firm* — Patterson & Sheridan LLP

(57) ABSTRACT

A system and method for filter based pruning of a convolutional neural network (CNN), is disclosed. The method includes initializing a CNN, the CNN including a plurality of filters, each filter associated with a weight and a filter factor; providing the CNN with a training input; adjusting a weight of a filter of the plurality of filters in response to processing the training input; adjusting a filter factor of the filter of the plurality of filters in response to processing the training input; pruning the CNN by removing the filter in response to detecting that a value of the filter factor is below a predefined threshold after training is complete; storing a trained pruned CNN based on the initialized CNN; and processing an input with the trained CNN.

17 Claims, 5 Drawing Sheets

(56) References Cited

U.S. PATENT DOCUMENTS

| | | | | |
|---|---|---|---|---|
| 2023/0162477 A1* | 5/2023 | Li | G06V 10/764 | |
| | | | 382/159 | |
| 2023/0259776 A1* | 8/2023 | Choe | G06N 3/0464 | |
| | | | 706/26 | |

OTHER PUBLICATIONS

International Search Report for PCT/GR2023/000029, dated Jan. 16, 2024. Searching Authority: European Patent Office, Rijswijk, Netherlands.

Liu Yanli et al: "SMOF: Squeezing More Out of Filters Yields Hardware-Friendly CNN Pruning" In: "Artificial Intelligence : Second CAAI International Conference, CICAI 2022, Beijing, China, Aug. 27-28, 2022, Revised Selected Papers, Part I", Dec. 17, 2022 (Dec. 17, 2022), Springer Nature Switzerland, XP093115567, ISSN: 0302-9743 ISBN: 978-3-031-20497-5 vol. 13604, pp. 242-254, DOI: 10.1007/978-3-031-20497-5_20, Retrieved from the Internet: URL: https://link.springer.com/content/pdf/10.1007/978-3-031-20497-5_20.

Written Opinion of the Searching Authority for PCT/GR2023/000029, dated Jan. 16, 2024. Searching Authority: European Patent Office, Rijswijk, Netherlands.

Choi, Y., et al. "Compression of Deep Convolutional Neural Networks under Joint Sparsity Constraints" Oct. 29, 2018. (Year: 2018).

Ding X., et al. "Global Sparse Momentum SGD for Pruning Very Deep Neural Networks" 33rd Conference on Neural Information Processing Systems (NeurIPS 2019), Vancouver, Canada. (Year: 2019).

Louizos, C. et al. "Bayesian Compression for Deep Learning", 31st Conference on Neural Information Processing Systems (NIPS 2017), Long Beach, CA, USA. (Year: 2017).

Tessier, H. et al. "Rethinking Weight Decay for Efficient Neural Network Pruning", J. Imaging 2022, 8, 64. https://doi.org/10.3390/jimaging8030064 (Year: 2022).

* cited by examiner

FILTER BASED PRUNING TECHNIQUES FOR CONVOLUTIONAL NEURAL NETWORKS

CROSS-REFERENCE TO RELATED APPLICATIONS

This application is a National Stage Application submitted under 35 U.S.C. 371 of International Application No. PCT/GR2023/000029 filed on Jul. 3, 2023, now pending. The contents of the above-referenced applications are hereby incorporated by reference.

TECHNICAL FIELD

The present disclosure relates generally to convolutional neural networks, and specifically to optimizing processor execution of convolutional neural networks by performing filter-based pruning.

BACKGROUND

Convolutional neural networks (CNNs) are utilized in many artificial intelligence (AI) applications these days, as computer hardware has increasingly become more adapted to such applications. Some of their uses include image detection (i.e., computer vision), processing of natural language, patter recognition, generation and discrimination, and so on.

However, CNNs still require high costing computing power, including processors, memory, power consumption, and the like. As such, they are largely unsuitable for applications where limited compute resources are available, which is the case for many edge devices.

In order to overcome these challenges, CNN compression techniques are utilized. These techniques include pruning, quantization, factorization and distillation. Pruning is a process whereby portions of the neural network, including filters, channels, layers, etc. are removed, such that the effect on the neural network is not noticeable, or is otherwise acceptable.

The two main approaches of pruning, include unstructured pruning, and structured pruning. Setting weights to zero is an example of unstructured pruning. Removing an entire filter is an example of filtered pruning. Pruning can occur at initialization, by a mask during training, by penalizing weights, and the like.

No particular method has been shown to be superior to others, and a method that works well for a CNN for a first application (e.g., image recognition) will not necessarily work as well for a CNN for a second application (e.g., natural language processing).

It would therefore be advantageous to provide a solution that would overcome the challenges noted above.

SUMMARY

A summary of several example embodiments of the disclosure follows. This summary is provided for the convenience of the reader to provide a basic understanding of such embodiments and does not wholly define the breadth of the disclosure. This summary is not an extensive overview of all contemplated embodiments, and is intended to neither identify key or critical elements of all embodiments nor to delineate the scope of any or all aspects. Its sole purpose is to present some concepts of one or more embodiments in a simplified form as a prelude to the more detailed description that is presented later. For convenience, the term "some embodiments" or "certain embodiments" may be used herein to refer to a single embodiment or multiple embodiments of the disclosure.

A system of one or more computers can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by data processing apparatus, cause the apparatus to perform the actions.

In one general aspect, method may include initializing a CNN, the CNN including a plurality of filters, each filter associated with a weight and a filter factor. Method may also include providing the CNN with a training input. Method may furthermore include adjusting a weight of a filter of the plurality of filters in response to processing the training input. Method may in addition include adjusting a filter factor of the filter of the plurality of filters in response to processing the training input. Method may moreover include pruning the CNN by removing the filter in response to detecting that a value of the filter factor is below a predefined threshold after training is complete. Method may also include storing a trained pruned CNN based on the initialized CNN. Method may furthermore include processing an input with the trained CNN. Other embodiments of this aspect include corresponding computer systems, apparatus, and computer programs recorded on one or more computer storage devices, each configured to perform the actions of the methods.

Implementations may include one or more of the following features. Method may include: determining a number of single instruction multiple data (SIMD) processing units; removing a number of filters based on the filter factor, such that a second number of remaining filters is a whole multiple of the number of SIMD processing units. Method may include: selecting a number of second filters, each having a filter factor value which exceeds the predefined threshold; and removing a number of filters, the number of filters equal to a number of filters having a filter factor value below the predefined threshold added to the number of second filters. Method may include: determining a number of single instruction multiple data (SIMD) processing units; removing a number of filters based on the filter factor, such that the number of removed filters is a whole multiple of the number of SIMD processing units. Method may include: selecting a number of second filters, each having a filter factor value which exceeds the predefined threshold; and removing a number of filters, the number of filters equal to a number of filters having a filter factor value below the predefined threshold added to the number of second filters. Method where the filter factor of each filter of the plurality of filters includes a value selected between a lower limit value and an upper limit value. Method where a weight value, a filter factor value, and a combination thereof is stored as any one of: a fixed point value, a floating point value, an integer value, and any combination thereof. Method where the trained pruned CNN includes only filters having a filter factor above a predefined threshold. Method may include: applying a pruning technique only on a predetermined number of layers of the CNN. Method may include: applying a hyperparameter value in training the CNN. Method where a loss function of the CNN includes a base loss function and a filter based pruning loss function. Implementations of the described techniques may include hardware, a method or process, or a computer tangible medium.

In one general aspect, non-transitory computer-readable medium may include one or more instructions that, when executed by one or more processors of a device, cause the device to: initialize a CNN, the CNN including a plurality of filters, each filter associated with a weight and a filter factor; provide the CNN with a training input; adjust a weight of a filter of the plurality of filters in response to processing the training input; adjust a filter factor of the filter of the plurality of filters in response to processing the training input; prune the CNN by removing the filter in response to detecting that a value of the filter factor is below a predefined threshold after training is complete; store a trained pruned CNN based on the initialized CNN; and process an input with the trained CNN. Other embodiments of this aspect include corresponding computer systems, apparatus, and computer programs recorded on one or more computer storage devices, each configured to perform the actions of the methods.

In one general aspect, system may include a processing circuitry. System may also include a memory, the memory containing instructions that, when executed by the processing circuitry, configure the system to: initialize a CNN, the CNN including a plurality of filters, each filter associated with a weight and a filter factor. System may in addition include providing the CNN with a training input. System may moreover include adjusting a weight of a filter of the plurality of filters in response to processing the training input. System may also include adjusting a filter factor of the filter of the plurality of filters in response to processing the training input. System may furthermore include pruning the CNN by removing the filter in response to detecting that a value of the filter factor is below a predefined threshold after training is complete. System may in addition include store a trained pruned CNN based on the initialized CNN. System may moreover include processing an input with the trained CNN. Other embodiments of this aspect include corresponding computer systems, apparatus, and computer programs recorded on one or more computer storage devices, each configured to perform the actions of the methods.

Implementations may include one or more of the following features. System where the memory contains further instructions which when executed by the processing circuitry further configure the system to: determine a number of single instruction multiple data (SIMD) processing units; and remove a number of filters based on the filter factor, such that a second number of remaining filters is a whole multiple of the number of SIMD processing units. System where the memory contains further instructions which when executed by the processing circuitry further configure the system to: select a number of second filters, each having a filter factor value which exceeds the predefined threshold; and remove a number of filters, the number of filters equal to a number of filters having a filter factor value below the predefined threshold added to the number of second filters. System where the memory contains further instructions which when executed by the processing circuitry further configure the system to: determine a number of single instruction multiple data (SIMD) processing units; and remove a number of filters based on the filter factor, such that the number of removed filters is a whole multiple of the number of SIMD processing units. System where the memory contains further instructions which when executed by the processing circuitry further configure the system to: select a number of second filters, each having a filter factor value which exceeds the predefined threshold; and remove a number of filters, the number of filters equal to a number of filters having a filter factor value below the predefined threshold added to the number of second filters. System where the filter factor of each filter of the plurality of filters includes a value selected between a lower limit value and an upper limit value. System where a weight value, a filter factor value, and a combination thereof is stored as any one of: a fixed point value, a floating point value, an integer value, and any combination thereof. System where the trained pruned CNN includes only filters having a filter factor above a predefined threshold. System where the memory contains further instructions which when executed by the processing circuitry further configure the system to: apply a pruning technique only on a predetermined number of layers of the CNN. System where the memory contains further instructions which when executed by the processing circuitry further configure the system to: apply a hyperparameter value in training the CNN. System where a loss function of the CNN includes a base loss function and a filter based pruning loss function. Implementations of the described techniques may include hardware, a method or process, or a computer tangible medium.

BRIEF DESCRIPTION OF THE DRAWINGS

The subject matter disclosed herein is particularly pointed out and distinctly claimed in the claims at the conclusion of the specification. The foregoing and other objects, features, and advantages of the disclosed embodiments will be apparent from the following detailed description taken in conjunction with the accompanying drawings.

DETAILED DESCRIPTION

Figure 1:
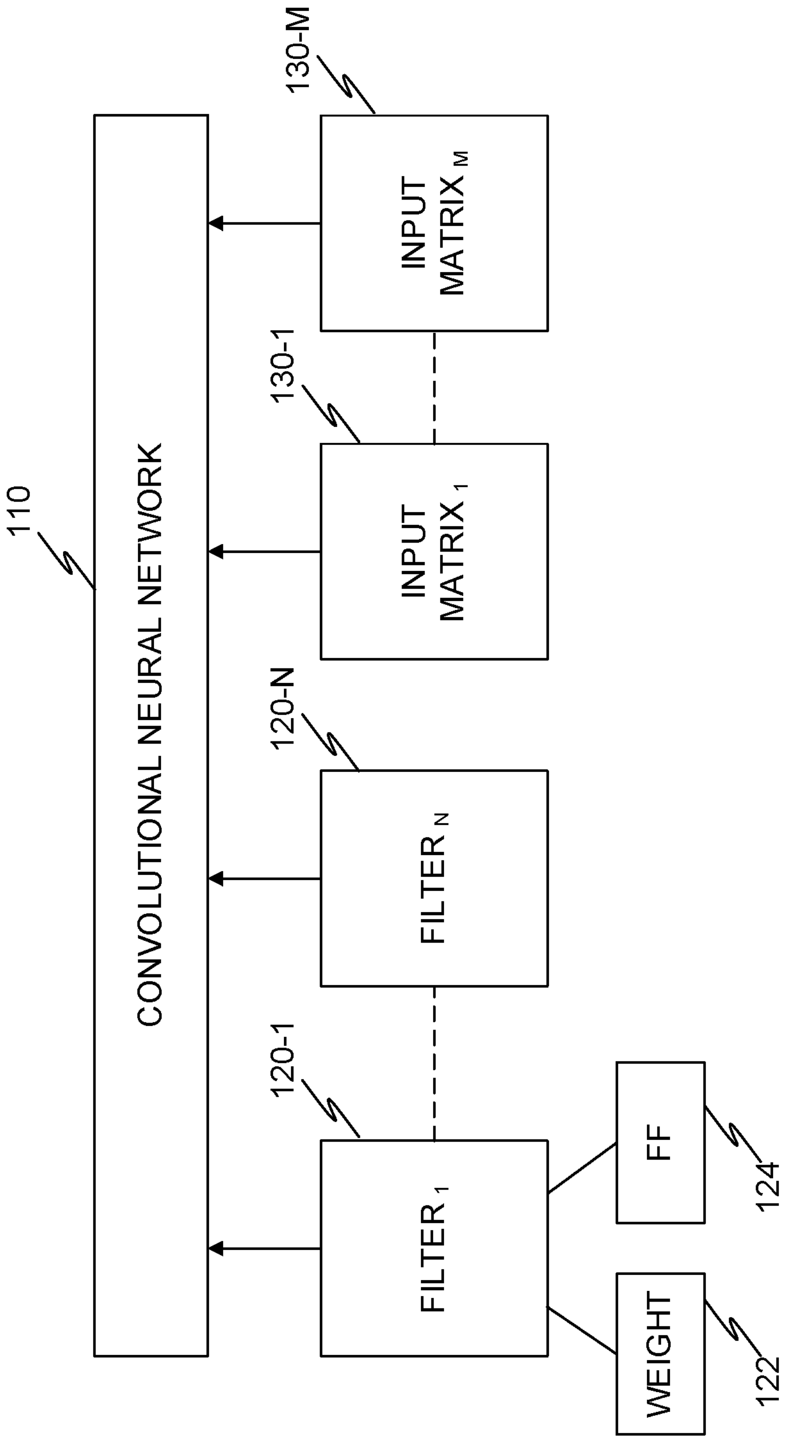
FIG. 1 is an example schematic illustration of a convolutional neural network, utilized to describe an embodiment.

It is important to note that the embodiments disclosed herein are only examples of the many advantageous uses of the innovative teachings herein. In general, statements made in the specification of the present application do not necessarily limit any of the various claimed embodiments. Moreover, some statements may apply to some inventive features but not to others. In general, unless otherwise indicated, singular elements may be in plural and vice versa with no loss of generality. In the drawings, like numerals refer to like parts through several views.

The various disclosed embodiments include a method and system for filter based pruning techniques for convolutional neural networks (CNNs). According to some embodiments, a filter factor is associated with each filter, in addition to a weight which is associated with the filter. During a training process of the CNN, weights and filter factors are adjusted, in order to simultaneously train the neural network and determine what filters can be pruned from the neural network.

According to certain embodiments, the filter factor includes a sinusoidal function, or similar function which is initialized to an unstable equilibrium point (e.g., 0.5 for a sinusoidal function which outputs values between 0 and 1), such that when processed as part of a loss function of the neural network, the filter factor is pulled into a stable value (e.g., 0 or 1 in the case of a sinusoidal function). This is advantageous over, for example, selective weight decay techniques, as the weight of the filter is not taken into account, since a single weight value does not necessarily indicate that the filter has little effect on the total outcome of the CNN. It is therefore advantageous, in certain embodiments, to have a filter factor which is separated from a weight value of the filter.

In some embodiments, the number of filters pruned is further determined by a number of processing units of a particular architecture, for example, a single instruction multiple data (SIMD) processor. In certain embodiments, pruning a number of filters according to the number of processing units of a SIMD reduces a number of processing cycles, thereby saving processing time and using less energy.

For example, according to some embodiments, where the processor includes eight SIMD lanes, a number of filters are pruned such that the remaining number of filters of the CNN are equal to a whole multiple of the number of SIMD lanes. In certain embodiments, where the system determines that pruning a determined number of filters (based on the filter factor) results in a remainder of filters which is not a whole multiple of the number of SIMD lanes, the system is configured to not prune the determined number of filters. In other embodiments, the system is configured to prune an additional number of filters so that the remaining number of filters is a number which is a whole multiple of the number of SIMD lanes. In some embodiments, the additional number of filters is determined based on a filter factor value, a weight value, an association with a particular layer, a combination thereof, and the like.

FIG. 1 is an example schematic illustration of a convolutional neural network, utilized to describe an embodiment. According to an embodiment, a convolutional neural network (CNN) 110 includes a plurality of layers, such as a fully connected layer, a rectified linear unit (ReLU) layer, a convolution layer, a combination thereof, and the like. In an embodiment, the CNN further includes filters, kernels, and the like. For example, a filter is represented, according to an embodiment, as a matrix of 'i' by 'k' (where 'i' and 'k' are each integers, at least one having a value of '2' or greater), stored as an array of values.

In some embodiments, the values are floating point values, integer values, fixed point values, a combination thereof, and the like.

In certain embodiments, the CNN 110 includes a plurality of filters 120-1 through 120-N, referred to generally as filters 120, and individually as filter 120, where 'N' is an integer having a value of '2' or greater. In some embodiments, the CNN 110 is configured to receive a fixed size input, for example as an input matrix. In an embodiment, the CNN 110 is configured to receive a plurality of input matrices 130-1 through 130-M, referred to generally as input matrices 130, and individually as input matrix 130, where 'M' is an integer having a value of '2' or greater.

In an embodiment, a filter 120, such as first filter 120-1, includes a weight 122, and a filter factor 124. In certain embodiment, the weight 122, and the filter factor 124, each have a floating point value, a fixed point value, an integer value, and the like. For example, in an embodiment, the filter factor 124 is initialized to a predefined value, for example having a value between '0' and '1', between '0' and '100', etc.

In an embodiment, the CNN 110 includes a predefined loss function. In certain embodiments, the predefined loss function includes a differentiable term which is generated based on values of filter factors, such as filter factor 124. For example, according to an embodiment, a loss function of the CNN 110 is defined as:

$$\text{Original}_{Loss} = \sum_{i=1}^{n} (t_i \log(p_i))$$

where $t_i$ is the truth label and $p_i$ is the Softmax probability for the i class, where the Softmax function converts a vector of K real numbers into a probability distribution of K possible outcomes. The total loss function is therefore:

$$\text{Total}_{Loss} = \text{Original}_{Loss} + FBP_{Loss}$$

where $$FBP_{Loss} = \sum\nolimits_{i=1}^{m} (\text{fbp\_per\_layer}_i)$$

and where m is the number of layers on which the filter based pruning (FPB) is applied. According to an embodiment, the term $\text{fbp\_per\_layer}_i$ is defined as:

$$\text{fbp\_per\_layer}_i = \frac{\sum_{j=1}^{k} (\text{fbp\_per\_filter}_{ij})}{k}$$

where k is the number of filters on the specific layer i. In an embodiment, the term $\text{fbp\_per\_filter}_{ij}$ is defined as:

$$\text{fbp\_per\_filter}_{ij} = \text{abs}(\sin(3.14 * \text{filter\_factor}_{ij}))$$

where 'abs' is the absolute value of the resulting sin(x) function. According to an embodiment, the $\text{filter\_factor}_{ij}$ is a value that is multiplied with all the weights of the $i^{th}$ layer of the $j^{th}$ filter.

According to an embodiment, the CNN 110 is configured to reduce the value of all the $\text{fbp\_per\_filter}_{ij}$, while maintaining a low value for the term $\text{Original}_{Loss}$ during a training process. This results in each filter having a filter factor which is equal, or within a threshold in some embodiments, to either '0' or '1' (or other edge values, where different values are utilized).

In an embodiment, a computing device is configured to train the CNN 110 by providing a training input, for example as input matrices 130. According to an embodiment, the CNN 110 is configured to include a loss function having a term which is affected by a value of filter factor 124 which allows to perform pruning and training simultaneously. This is advantageous as training and pruning the CNN 110 simultaneously requires less computational resources than initially training the CNN 110, and then pruning it. Thus, the performance of the computing device is improved, according to an embodiment.

According to an embodiment, a filter having a filter factor below a predefined threshold is pruned, i.e., the filter is removed from the CNN 110. In an embodiment, removing a filter includes generating an instruction to delete data representing the filter. For example, in an embodiment, where the filter factor 124 of filter 120-1 has a value of '0.002' and the threshold is defined as '0.01', the filter 120-1 is removed from the CNN 110.

In certain embodiments, a plurality of filters are detected, each filter of the plurality of filters having a filter factor which is below the predetermined threshold. In some embodiments, a number of filters are pruned, such that the number of remaining filters of the CNN 110 is equal to a multiple of a number of processing units of a processor circuitry. In certain embodiments, a number of filters are pruned, such that the number of filters which are pruned is a multiple of a number of processing units of the processor circuitry. An example processing circuitry is discussed in more detail in FIG. 2 below.

Figure 2:
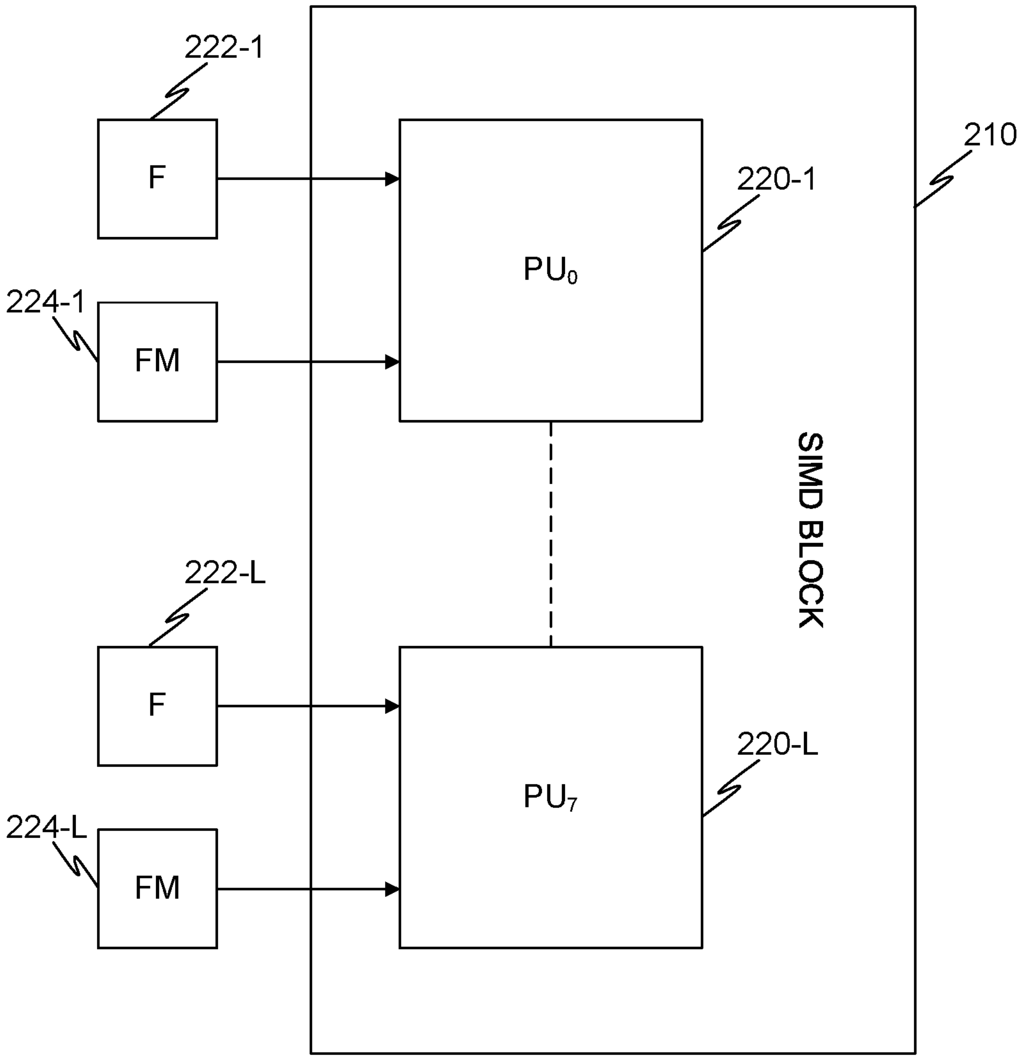
FIG. 2 is an example schematic illustration of a single instruction multiple data (SIMD) block, utilized to describe an embodiment.

FIG. 2 is an example schematic illustration of a single instruction multiple data (SIMD) block, utilized to describe an embodiment. In an embodiment, a SIMD block 210 includes a plurality of processing units (PUs) 220-1 through 220-L, referenced individually as PU 220, and referenced collectively as PUs 220, where 'L' is an integer having a value of '2' or greater. For example, in an embodiment, where 'L' equals '8', there are eight PUs 220, each configured to perform a same operation on received inputs.

In certain embodiments, the operation is a convolution between two inputs. For example, in an embodiment, a first PU 220-1 receives a first filter 222-1 and a first feature matrix 224-1. According to an embodiment, the first filter 222-1 is a matrix, tensor, array, and the like, of values, wherein the values are floating point, fixed point, integer, etc. In some embodiments, the first filter 222-1 includes an array size, for example of 'X' values by 'Y' values, where 'X' and 'Y' are each integers, at least one having a value of '2' or greater. In an embodiment, the first feature matrix 224-1 is an input matrix, array of values, tensor, and the like, having values which are floating point, fixed point, integer, etc.

According to an embodiment, the PU 220-1 is configured to receive the first filter 222-1 and the feature matrix 224-1, performs a convolution between them, and generates an output. In certain embodiments, the output is stored in a storage, a memory, a cache, and the like. In some embodiments, the output is used as an input in a later computation performed by the SIMD block 210.

In certain embodiments, the PUs 220 of the SIMD block 210 are configured to receive inputs simultaneously, process the inputs, and generate respective outputs. This is referred to as a processing cycle. In an embodiment, for each processing cycle, the entire SIMD block 210 is powered, regardless of the number of inputs which the SIMD block 210 is processing for that cycle. Therefore, in order to maximize power utilization, it is beneficial to have all PUs 220 processing an input for any given cycle.

However, where the number of filters is not a multiple of the number of PUs, there is a mismatch and therefore the SIMD block 210 is under-utilized. For example, in an embodiment where there are eight PUs 220, and nine filters, processing the input would require two cycles, one which is fully utilized (i.e., each PU 220 receives an input and processes the received input) and one which is underutilized (e.g., a single PU receives an input, the remaining PUs are idle). Therefore, according to an embodiment, it is advantageous to prune a CNN so that the number of filters which are processed is equal to a multiple of the number of PUs 220 of the SIMD block 210, in order to maximize utilization of the SIMD block 210 and the power supplied to it.

Figure 3:
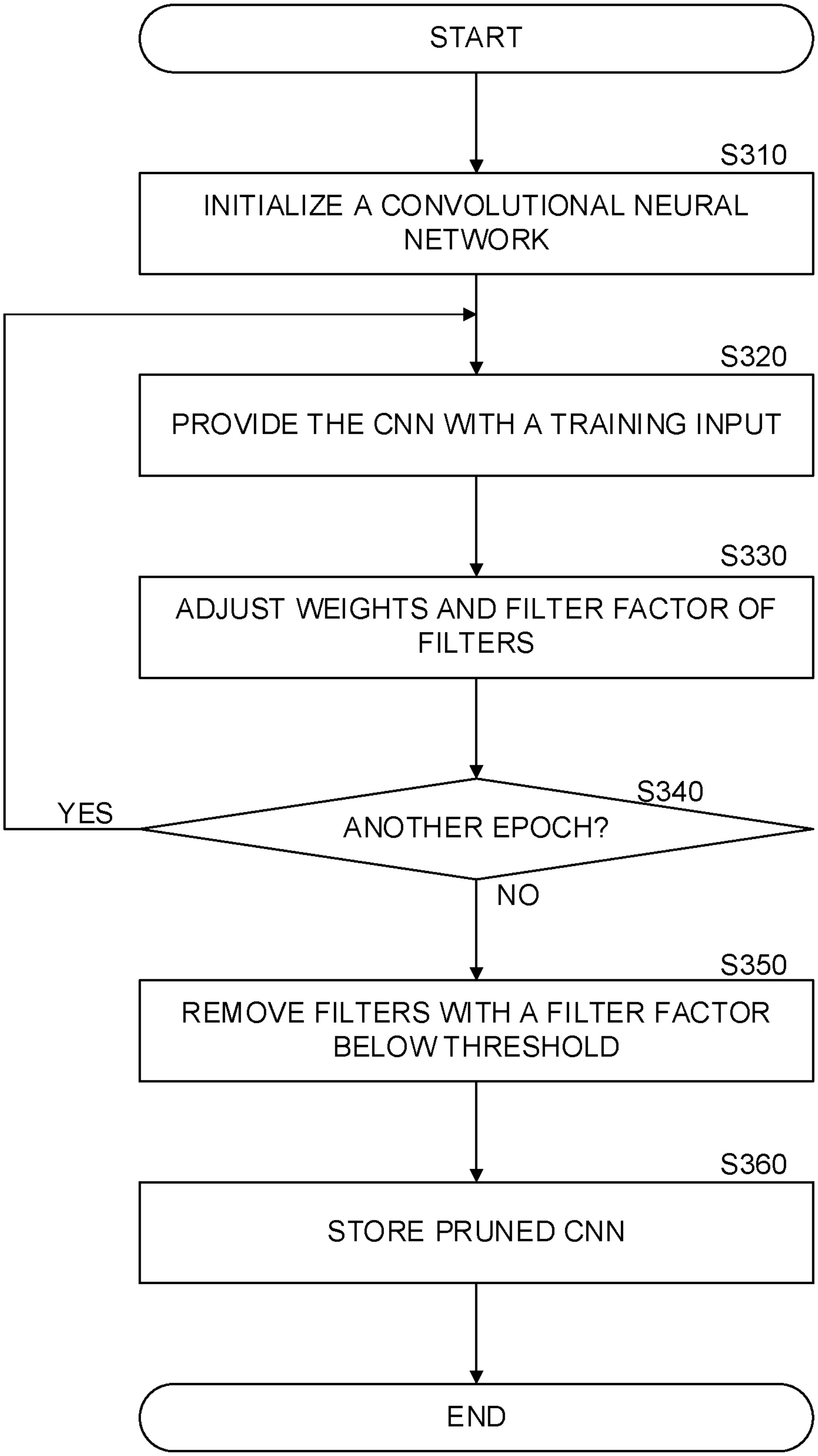
FIG. 3 is an example flowchart of a method for filter based pruning of a convolutional neural network during training, implemented in accordance with an embodiment.

FIG. 3 is an example flowchart of a method for filter based pruning of a convolutional neural network during training, implemented in accordance with an embodiment. In an embodiment, performing filter based pruning during the training process of a CNN is advantageous as it reduces the amount of time required to utilize a neural network. A trained and pruned CNN is "production-ready", meaning it can be utilized with an input and generate an output based on what it was trained to classify, detect, and the like. Reducing time to having a CNN production-ready is advantageous, and reducing processor and memory requirements is likewise advantageous.

A convolutional neural network which has filters pruned requires less memory to store, and requires less processor resources, as less computations are required to process an unpruned CNN, versus a pruned version of the same CNN.

At S310, a convolutional neural network (CNN) is initialized. In an embodiment, initializing a CNN includes generating computer code, which, when executed by a processing circuitry, configures a system to generate, at least, a plurality of data structures, such as matrices, tensors, and the like, which form layers of a CNN. In an embodiment, layers include a fully connected layer, a rectified linear unit (ReLU) layer, a convolution layer, a combination thereof, and the like. In certain embodiments, the CNN further includes filters, kernels, and the like.

In certain embodiments, initializing a CNN includes generating values for each of the layers. In some embodiments, initializing a CNN includes generating values for each filter, kernel, and the like. In certain embodiments, where a value is not generated for an element of a filter, for example, the element receives a value of '0' (zero). In some embodiments, the values are floating point values, fixed point values, integer values, a combination thereof, and the like. In certain embodiments, the values are generated based on a seed value provided to a random number generator application. In an embodiment, the random number generator application is deployed on the system and executed by a processing circuitry thereof.

In some embodiments, initializing the CNN includes assigning a weight value, a filter factor value, a combination thereof, and the like, to each of a plurality of filters. In some embodiments, certain filters are initialized with a filter factor, and a portion of filters are initialized without a filter factor.

At S320, the CNN is provided with a training input. In an embodiment, the training input includes an image, an image classification, an audio file, an audio classification, a text, a text classification, a combination thereof, and the like. In some embodiments, the training input is provided as an input matrix, a feature matrix, a tensor, an array, a combination thereof, and the like.

In some embodiments, the training input is a fixed size input. For example, where the training input includes a plurality of images, a fixed size input is generated from each image, by storing an overlapping portion, a non-overlapping portion, and the like, of the input image. For example, where the input image is 256 by 256 pixels, and the fixed size input requires a 4 by 4 pixel input, then 4,096 fixed size inputs are generated (each having 16 pixels arranged in a 4 by 4 matrix) and provided as training inputs. In some embodiments, an output generated by the CNN is utilized as a subsequent input, for example in a next training epoch, a next batch, a back propagation, and the like.

At S330, a weight and a filter factor are adjusted for a filter. In an embodiment, adjusting a weight and a filter factor are performed independently, i.e., each respective value of the weight and filter factor are adjusted independent of one another. In some embodiments, the weight value, the filter factor value, and a combination thereof, are adjusted based on a loss function of the convolutional neural network.

In certain embodiments, a plurality of inputs are utilized in a first training batch. A plurality of outputs are generated based on the first training batch, and an error rate is computed based on a comparison generated between the generated outputs and a respective expectation value for each output. For example, in an embodiment, an expected value of a training image is a predefined classification value. In certain embodiments, the generated output is compared to the predefined classification value, and a loss function output, such as described in more detail above, is determined.

In an embodiment, adjusting a value for a filter weight, adjusting a value of a filter factor, a combination thereof, and the like, is performed in response to executing a first training batch, generating an output, comparing the output to an expected value, and determining a loss function output. In some embodiments, only a filter factor is adjusted, only a weight value is adjusted, and the like. In certain embodiments, a filter factor value and a weight value are both adjusted after a first training batch, a filter factor value only is adjusted after a first training batch, a weight factor value only is adjusted after a first training batch, a filter factor value is adjusted after a first training batch and a weight value is adjusted after a second training batch, a weight value is adjusted after a first training batch and a filter factor value is adjusted after a second training batch, a combination thereof, and the like.

In some embodiments, the CNN includes a plurality of hyperparameters. In certain embodiments, a hyperparameter is adjusted prior to training, after training, during training, and the like. In an embodiment, a hyperparameter includes a frozen layer flag, a filter factor multiplication value, a number of epochs, a number of batches, a number of layers to apply filter based pruning on, a combination thereof, and the like.

For example, in an embodiment, a frozen layer flag indicates if a first layer associated with a flag (stored for example as a Boolean value), is set to a first state, all layers preceding the first layer are frozen (i.e., cannot be pruned), all layers superseding the first layer are frozen, and the like. In some embodiments, a second frozen layer flag indicates that weights of the layer should not be adjusted during training. For example, fine-tuning a CNN is a process by which weights of some layers, typically the first layers of the CNN, are frozen (i.e., not changed), while weights of other layers are adjusted by training a pretrained CNN on some secondary inputs. Therefore, in certain embodiments, a first flag indicates that a layer can (or cannot) be pruned, and a second flag indicates that weights of the layer can (or cannot) be adjusted.

In some embodiments, a filter factor multiplication value is a value, such as a numerical value, by which the term $FBP_{Loss}$ in the equation $Total_{Loss}=Original_{Loss}+FBP_{Loss}$ is multiplied. Adjusting this value allows to gauge how much training should take pruning into account, e.g., a higher value results in more pruning.

In some embodiments, a number of layers are determined to which filter based pruning should be applied. For example, according to an embodiment, filter based pruning is applied to the last three layers, last four layers, last five layers, etc. This is advantageous for example in a neural network, where the majority of weights and operations are performed on the last few layers.

At S340, a test is performed to determine if another epoch should be completed. In an embodiment, a predetermined number of training epochs are set, for example by setting a corresponding hyperparameter value. In an embodiment, where the hyperparameter value is higher than the current epoch number, another epoch is executed. In certain embodiments where 'YES', execution continues at S320. In an embodiment, where no additional epochs are required (e.g., 'NO'), execution continues at S350. For example, where the number of the epoch is equal to the predefined hyperparameter value, execution continues at S350.

At S350, a filter is removed. In an embodiment, pruning a filter, removing a filter, deleting a filter, and the like, are equivalent operations. In some embodiments, a filter is removed where the filter factor is below a predetermined threshold. In some embodiments, a filter is stored where the filter factor value exceeds a predetermined threshold.

In some embodiments, a plurality of filters are selected, each filter having a filter factor value which is below the predefined threshold. In some embodiments, a portion of the plurality of filters are pruned based on a number of processing units in a single instruction multiple data (SIMD) block, such that a number of remaining filters is a multiple of the number of processing units in the SIMD block. For example, where the SIMD block size includes eight processing units, the number of filters remaining in the convolutional neural network should be a multiple of eight (e.g., 8, 16, 32, 64, etc.). In certain embodiments, the portion of filters are further selected based on the filter factor value.

For example, according to an embodiment, where the plurality of filters includes ten filters which can be pruned (e.g., each has a filter factor lower than the predefined threshold), and the SIMD block includes eight processing units, eight filters need to be selected for storing (or alternatively two filters need to be selected for pruning). In an embodiment, the two filters selected for pruning are the filters having a filter factor value which is lowest, and the remaining eight filters each have a filter factor value which is higher than the filter factor value of any of the two filters which are selected for pruning.

In some embodiments, a hyperparameter output is generated, indicating a number of pruned filters. In certain embodiments, the system is further configured to determine a SIMD block which, if applied for processing the CNN, would result in a more efficient pruning. For example, where seven filters are determined to be pruned for a CNN having a total of 16 filters, deployed on a SIMD block having 8 processing units, no filters will be pruned, according to an embodiment. This is because processing the remaining nine filters or processing the entire 16 filters would require two processing cycles (i.e., 8+1, or 8+8), therefore no processing savings would be realized in such an embodiment.

In some embodiments, the system generates a notification to deploy the CNN on a SIMD block having four processing units, which results in four filters being pruned, thus reducing the amount of memory required to store the CNN. This is advantageous in certain edge computing solutions where memory space is a concern.

At S360, the pruned convolutional neural network is stored. In an embodiment, the stored neural network includes only filters having a filter factor above a predetermined threshold. In some embodiments, the pruned CNN is a trained CNN.

Figure 4:
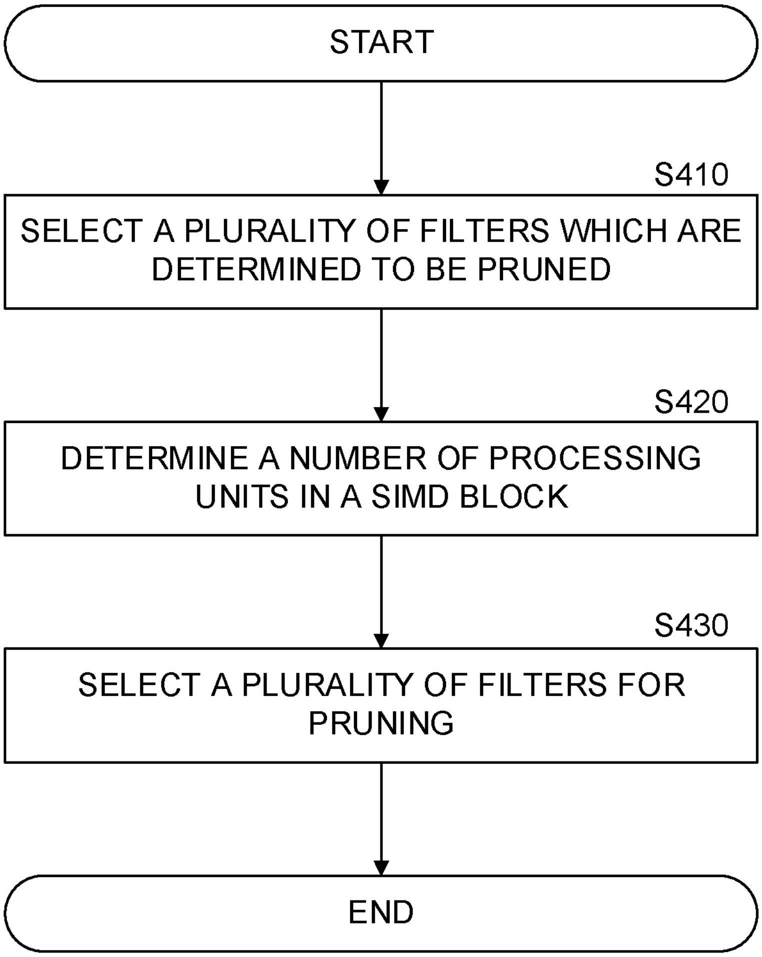
FIG. 4 is an example flowchart of a method for filter pruning selection in a convolutional neural network, implemented in accordance with an embodiment.

FIG. 4 is an example flowchart of a method for filter pruning selection in a convolutional neural network, implemented in accordance with an embodiment. In an embodiment, filter based pruning includes determining which filters can be pruned, and selecting from those filters which filters should be pruned to maximize processor utility.

According to an embodiment, it is advantageous to reduce the number of filters (i.e., prune filters) in order to reduce memory required to store and process the neural network, and it is further advantageous to reduce the number of processing cycles where possible.

In certain embodiments, for example as illustrated above, it is also advantageous to balance these two factors. For example, where memory is not a concern, it is advantageous, according to some embodiments, to preserve a filter which is determined to be pruned, as pruning will not reduce the number of cycles required to process the neural network. In some embodiments, it is advantageous to prune a filter which is otherwise determined to be preserved, where pruning the filter allows to reduce a number of computation cycles. In certain embodiments, determining a filter to be pruned further includes determining assessing an effect on the error function of the CNN.

For example, in an embodiment 15 filters are determined to be pruned out of 64 total filters, where the SIMD block is of 16 processing units. In an embodiment, another filter is selected for pruning, and an accuracy is determined for the pruned CNN (i.e., the CNN having removed the 15 filters, and the additional filter), versus the unpruned (i.e., original) CNN. In certain embodiments, where accuracy is not affected, or is affected within a predetermined threshold (e.g., 1%), the loss is determined to be an acceptable tradeoff, the 16 filters (i.e., 15+1) are pruned. This allows decreasing the number of processing cycles required to process the remaining filters (i.e., from 4 processing cycles to 3 processing cycles), such that they are a multiple of 16. Otherwise, removing 15 filters would still require four processing cycles (i.e., 3 processing cycles utilizing all 16 SIMD lanes, and 1 processing cycle utilizing a single SIMD lane), thereby not realizing the full processing savings.

At S410, a plurality of prunable filters are selected. In an embodiment, the plurality of filters are selected based on a filter factor value, a filter factor threshold, a combination thereof, and the like. In some embodiments, the plurality of filters are selected such that a first portion of filters includes filter factor values below a predefined threshold. In some embodiments, an additional filter is selected which is above the predefined threshold, and has a filter factor value which is lower than a filter factor value of any other filter which has a filter factor value that exceeds the threshold.

At S420, a number of processing units are determined. In an embodiment, the number of processing units is determined based on a computing architecture of a single input multiple data (SIMD) block. For example, in an embodiment, the SIMD block includes four processing units, six processing units, eight processing units, and the like.

In certain embodiments, a processing circuitry includes multiple architectures, for example a SIMD block of eight processing units, and a SIMD block of four processing units.

At S430, a plurality of filters are selected for pruning. In an embodiment, a filter is selected for pruning from the plurality of prunable filters, i.e., filters which are determined that can be pruned (e.g., based on a value of a respective filter factor). In certain embodiments, a number of filters of the plurality of filters selected for pruning is determined based on the determined number of processing units and the number of prunable filters.

For example, in an embodiment, the filters selected for pruning are selected in order to minimize memory usage. In such embodiments, all filters which can be pruned, are pruned from the CNN. In some embodiments, filters are selected for pruning to maximize processor utilization (i.e., minimize a number of processing cycles). In such embodiments, a number of filters is determined which is a whole multiple of the number of processing units, and those filters are pruned. For example, where 9 filters can be pruned for a SIMD block having eight processing units, 8 filters are pruned and one is preserved, as pruning the remaining filter does not result in utilizing less processing cycles.

In some embodiments, a pruning remainder is determined, for example by determining how many filters can be pruned, how many processing units at in a SIMD block, and determining a difference between the number of prunable filters and the closest multiple of the number of processing units in the SIMD block which exceeds the number of prunable filters.

For example, according to an embodiment, out of 256 filters of a CNN, 63 filters are determined to be prunable (i.e., can be pruned) based on a value of their respective filter factors, and the number of processing units in a SIMD block is eight. Therefore, 56 filters can be pruned. In some embodiments, it is advantageous to determine if another filter can be pruned, bringing the total to 64 filters which are pruned. In an embodiment, selecting the extra filter (or filters) is based on the filter factor value, the weight value, a combination thereof, and the like, of a filter having a filter factor value which exceeds the predetermined threshold. This allows to prune 64 filters, rather than 56, resulting in an increased memory and processor improvement, by reducing the number of processing cycles.

In some embodiments, an accuracy of the CNN is determined. In the example above, the accuracy of the NN is determined based on pruning of the 56 filters, and again based on pruning 63 filters and another selected filter. In an embodiment, where the accuracy exceeds the threshold value (i.e., the pruned CNN is less accurate than desirable), 56 filters are pruned, 63 filters are pruned, and the like, based on a hyperparameter (such as maximizing processor utility, minimizing memory usage, etc.)

Figure 5:
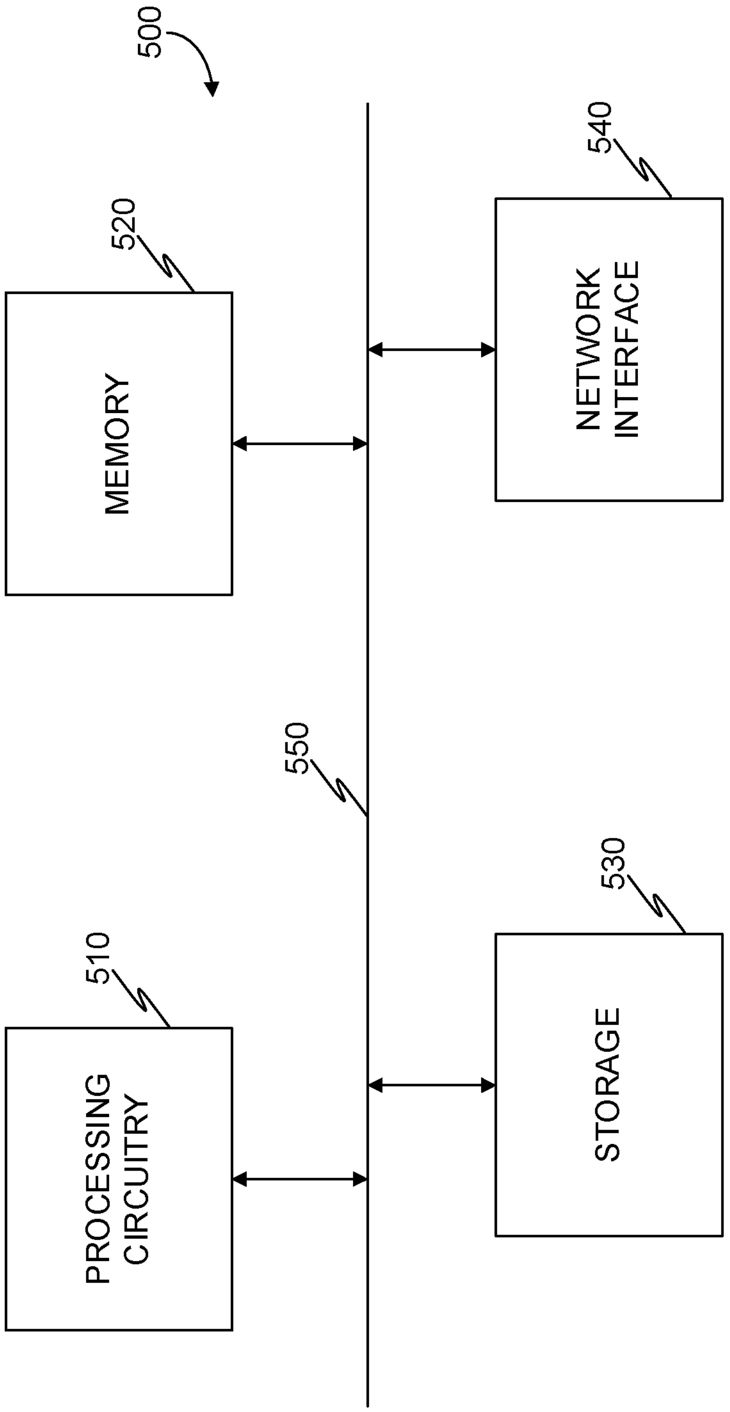
FIG. 5 is an example schematic diagram of a system for training and pruning a convolutional neural network according to an embodiment.

FIG. 5 is an example schematic diagram of a system 500 for training and pruning a convolutional neural network according to an embodiment. The system 500 includes a processing circuitry 510 coupled to a memory 520, a storage 530, and a network interface 540. In an embodiment, the components of the system 500 may be communicatively connected via a bus 550.

The processing circuitry 510 may be realized as one or more hardware logic components and circuits. For example, and without limitation, illustrative types of hardware logic components that can be used include field programmable gate arrays (FPGAs), application-specific integrated circuits (ASICs), Application-specific standard products (ASSPs), system-on-a-chip systems (SOCs), graphics processing units (GPUs), tensor processing units (TPUs), general-purpose microprocessors, microcontrollers, digital signal processors (DSPs), and the like, or any other hardware logic components that can perform calculations or other manipulations of information.

The memory 520 may be volatile (e.g., random access memory, etc.), non-volatile (e.g., read only memory, flash memory, etc.), or a combination thereof. In an embodiment, the memory 520 is an on-chip memory, an off-chip memory, a combination thereof, and the like. In certain embodiments, the memory 520 is a scratch-pad memory for the processing circuitry 510.

In one configuration, software for implementing one or more embodiments disclosed herein may be stored in the storage 530, in the memory 520, in a combination thereof, and the like. Software shall be construed broadly to mean any type of instructions, whether referred to as software, firmware, middleware, microcode, hardware description language, or otherwise. Instructions may include code (e.g., in source code format, binary code format, executable code format, or any other suitable format of code). The instructions, when executed by the processing circuitry 510, cause the processing circuitry 510 to perform the various processes described herein.

The storage 530 is a magnetic storage, an optical storage, a solid-state storage, a combination thereof, and the like, and is realized, according to an embodiment, as a flash memory, as a hard-disk drive, or other memory technology, or any other medium which can be used to store the desired information.

The network interface 540 is configured to provide the system 500 with communication with, for example, an edge device on which a pruned CNN is stored.

It should be understood that the embodiments described herein are not limited to the specific architecture illustrated in FIG. 5, and other architectures may be equally used without departing from the scope of the disclosed embodiments. In some embodiments, the system 500 is further configured to deploy the pruned CNN.

The various embodiments disclosed herein can be implemented as hardware, firmware, software, or any combination thereof. Moreover, the software is preferably implemented as an application program tangibly embodied on a program storage unit or computer readable medium consisting of parts, or of certain devices and/or a combination of devices. The application program may be uploaded to, and executed by, a machine comprising any suitable architecture. Preferably, the machine is implemented on a computer platform having hardware such as one or more central processing units ("CPUs"), a memory, and input/output interfaces. The computer platform may also include an operating system and microinstruction code. The various processes and functions described herein may be either part of the microinstruction code or part of the application program, or any combination thereof, which may be executed by a CPU, whether or not such a computer or processor is explicitly shown. In addition, various other peripheral units may be connected to the computer platform such as an additional data storage unit and a printing unit. Furthermore, a non-transitory computer readable medium is any computer readable medium except for a transitory propagating signal.

All examples and conditional language recited herein are intended for pedagogical purposes to aid the reader in understanding the principles of the disclosed embodiment and the concepts contributed by the inventor to furthering the art, and are to be construed as being without limitation to such specifically recited examples and conditions. Moreover, all statements herein reciting principles, aspects, and embodiments of the disclosed embodiments, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

It should be understood that any reference to an element herein using a designation such as "first," "second," and so forth does not generally limit the quantity or order of those elements. Rather, these designations are generally used herein as a convenient method of distinguishing between two or more elements or instances of an element. Thus, a reference to first and second elements does not mean that only two elements may be employed there or that the first element must precede the second element in some manner. Also, unless stated otherwise, a set of elements comprises one or more elements.

As used herein, the phrase "at least one of" followed by a listing of items means that any of the listed items can be utilized individually, or any combination of two or more of the listed items can be utilized. For example, if a system is described as including "at least one of A, B, and C," the system can include A alone; B alone; C alone; 2A; 2B; 2C; 3A; A and B in combination; B and C in combination; A and C in combination; A, B, and C in combination; 2A and C in combination; A, 3B, and 2C in combination; and the like.

What is claimed is:

1. A method for filter based pruning of a convolutional neural network (CNN), comprising:
- initializing a CNN, the CNN including a plurality of filters, each filter associated with a weight and a filter factor;
- providing the CNN with a training input;
- adjusting a weight of a filter of the plurality of filters in response to processing the training input;
- adjusting a filter factor of the filter of the plurality of filters in response to processing the training input;
- pruning the CNN by removing the filter in response to detecting that a value of the filter factor is below a predefined threshold after training is complete, wherein removing the filter comprises:
  - determining a number of single instruction multiple data (SIMD) processing units;
  - selecting a number of second filters, each having a filter factor value which exceeds the predefined threshold; and
  - removing a number of filters based on the filter factor, such that a second number of remaining filters is a whole multiple of the number of SIMD processing units, and the number of filters equal to a number of filters having a filter factor value below the predefined threshold added to the number of second filters;
- storing a trained pruned CNN based on the initialized CNN; and
- processing an input with the trained CNN.

2. The method of claim 1, wherein
- the number of removed filters is a whole multiple of the number of SIMD processing units.

3. The method of claim 1, wherein the filter factor of each filter of the plurality of filters includes a value selected between a lower limit value and an upper limit value.

4. The method of claim 1, wherein a weight value, a filter factor value, and a combination thereof is stored as any one of: a fixed point value, a floating point value, an integer value, and any combination thereof.

5. The method of claim 1, wherein the trained pruned CNN includes only filters having a filter factor above a predefined threshold.

6. The method of claim 1, further comprising:
- applying a pruning technique only on a predetermined number of layers of the CNN.

7. The method of claim 1, further comprising:

applying a hyperparameter value in training the CNN.

8. The method of claim 1, wherein a loss function of the CNN includes a base loss function and a filter based pruning loss function.

9. A non-transitory computer-readable medium storing a set of instructions for filter based pruning of a convolutional neural network (CNN), the set of instructions comprising:

one or more instructions that, when executed by one or more processors of a device, cause the device to:

initialize a CNN, the CNN including a plurality of filters, each filter associated with a weight and a filter factor;

provide the CNN with a training input;

adjust a weight of a filter of the plurality of filters in response to processing the training input;

adjust a filter factor of the filter of the plurality of filters in response to processing the training input;

prune the CNN by removing the filter in response to detecting that a value of the filter factor is below a predefined threshold after training is complete, wherein removing the filter comprises:

determining a number of single instruction multiple data (SIMD) processing units;

selecting a number of second filters, each having a filter factor value which exceeds the predefined threshold; and removing a number of filters based on the filter factor, such that a second number of remaining filters is a whole multiple of the number of SIMD processing units, and the number of filters equal to a number of filters having a filter factor value below the predefined threshold added to the number of second filters;

store a trained pruned CNN based on the initialized CNN; and process an input with the trained CNN.

10. A system for filter based pruning of a convolutional neural network (CNN) comprising:

a processing circuitry; and a memory, the memory containing instructions that, when executed by the processing circuitry, configure the system to:

initialize a CNN, the CNN including a plurality of filters, each filter associated with a weight and a filter factor;

provide the CNN with a training input;

adjust a weight of a filter of the plurality of filters in response to processing the training input;

adjust a filter factor of the filter of the plurality of filters in response to processing the training input;

prune the CNN by removing the filter in response to detecting that a value of the filter factor is below a predefined threshold after training is complete, wherein removing the filter comprises:

determining a number of single instruction multiple data (SIMD) processing units;

selecting a number of second filters, each having a filter factor value which exceeds the predefined threshold; and removing a number of filters based on the filter factor, such that a second number of remaining filters is a whole multiple of the number of SIMD processing units, and the number of filters equal to a number of filters having a filter factor value below the predefined threshold added to the number of second filters;

store a trained pruned CNN based on the initialized CNN; and process an input with the trained CNN.

11. The system of claim 10, wherein the number of removed filters is a whole multiple of the number of SIMD processing units.

12. The system of claim 10, wherein the filter factor of each filter of the plurality of filters includes a value selected between a lower limit value and an upper limit value.

13. The system of claim 10, wherein a weight value, a filter factor value, and a combination thereof is stored as any one of: a fixed point value, a floating point value, an integer value, and any combination thereof.

14. The system of claim 10, wherein the trained pruned CNN includes only filters having a filter factor above a predefined threshold.

15. The system of claim 10, wherein the memory contains further instructions which when executed by the processing circuitry further configure the system to:

apply a pruning technique only on a predetermined number of layers of the CNN.

16. The system of claim 10, wherein the memory contains further instructions which when executed by the processing circuitry further configure the system to:

apply a hyperparameter value in training the CNN.

17. The system of claim 10, wherein a loss function of the CNN includes a base loss function and a filter based pruning loss function.

* * * * *